(12) United States Patent
Tokoro et al.

(10) Patent No.: US 7,777,669 B2
(45) Date of Patent: Aug. 17, 2010

(54) OBJECT DETECTION DEVICE

(75) Inventors: Setsuo Tokoro, Aichi (JP); Jun Tsuchida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 270 days.

(21) Appl. No.: 12/093,244

(22) PCT Filed: Oct. 31, 2006

(86) PCT No.: PCT/JP2006/322213
§ 371 (c)(1),
(2), (4) Date: Jun. 24, 2008

(87) PCT Pub. No.: WO2007/055215
PCT Pub. Date: May 18, 2007

(65) Prior Publication Data
US 2009/0201192 A1 Aug. 13, 2009

(30) Foreign Application Priority Data
Nov. 9, 2005 (JP) ............................. 2005-325033

(51) Int. Cl.
*G01S 13/00* (2006.01)
*G01S 13/08* (2006.01)
(52) U.S. Cl. ........................................ 342/70; 342/118
(58) Field of Classification Search ............. 342/70–72, 342/118
See application file for complete search history.

(56) References Cited
U.S. PATENT DOCUMENTS
5,752,215 A * 5/1998 Zaaiman et al. ............. 701/117
5,798,727 A * 8/1998 Shirai et al. .................... 342/70

(Continued)

FOREIGN PATENT DOCUMENTS
JP    A 2002-99906    4/2002

(Continued)

*Primary Examiner*—Thomas H Tarcza
*Assistant Examiner*—Peter M Bythrow
(74) *Attorney, Agent, or Firm*—Oliff & Berridge, PLC (57) ABSTRACT

An object of the present invention is to provide an object detection apparatus capable of detecting an object at high precision in accordance with the type of the object. The object detection apparatus of the present invention comprises: object position detection means 2, 22, 3, 23 for detecting the positions of objects; object type estimating means 24 for estimating the types of the objects; and object estimating means 24 for integrating a plurality of detection results for positions within a search area obtained by the object position detection means 2, 22, 3, 23 and thereby estimating the sizes of the objects, the object detection apparatus of the present invention being characterized in that the search area is set based on the types of the objects estimated by the object type estimating means 24. Moreover, the object detection apparatus of the present invention is characterized in that the object position detection means 2, 22, 3, 23 detects the positions of the objects by using a plurality of position detection criteria, that the object type estimating means 24 estimates the types of the objects based on the position detection criteria, according to which the object position detection means 2, 22, 3, 23 have been able to detect the positions of the objects, and that the search area is set based on the position detection criteria, according to which the positions of the objects have been detected.

8 Claims, 5 Drawing Sheets

U.S. PATENT DOCUMENTS

| | | | | |
|---|---|---|---|---|
| 6,018,308 | A * | 1/2000 | Shirai | 342/70 |
| 6,580,385 | B1 * | 6/2003 | Winner et al. | 342/70 |
| 6,590,521 | B1 * | 7/2003 | Saka et al. | 342/70 |
| 6,593,873 | B2 * | 7/2003 | Samukawa et al. | 342/70 |
| 6,680,689 | B1 * | 1/2004 | Zoratti | 342/70 |
| 6,819,779 | B1 * | 11/2004 | Nichani | 382/104 |
| 6,999,024 | B2 * | 2/2006 | Kumon et al. | 342/70 |
| 7,132,976 | B2 * | 11/2006 | Shinoda et al. | 342/70 |
| 7,136,753 | B2 * | 11/2006 | Samukawa et al. | 701/301 |
| 7,272,482 | B2 * | 9/2007 | Kubota | 701/96 |
| 7,496,449 | B2 * | 2/2009 | Samukawa et al. | 701/301 |
| 7,504,986 | B2 * | 3/2009 | Brandt et al. | 342/70 |
| 7,554,485 | B2 * | 6/2009 | Jordan | 342/90 |
| 7,570,197 | B2 * | 8/2009 | Takano et al. | 342/70 |
| 7,570,198 | B2 * | 8/2009 | Tokoro | 342/70 |
| 7,605,746 | B2 * | 10/2009 | Matsuura et al. | 342/70 |
| 2002/0147534 | A1 * | 10/2002 | Delcheccolo et al. | 701/45 |
| 2003/0004644 | A1 * | 1/2003 | Farmer | 701/301 |
| 2003/0174054 | A1 * | 9/2003 | Shimomura | 340/435 |
| 2003/0235327 | A1 * | 12/2003 | Srinivasa | 382/104 |
| 2004/0080449 | A1 * | 4/2004 | Horibe | 342/70 |
| 2004/0080450 | A1 * | 4/2004 | Cheong | 342/118 |
| 2004/0145512 | A1 * | 7/2004 | Takano et al. | 342/70 |
| 2004/0246167 | A1 * | 12/2004 | Kumon et al. | 342/70 |
| 2005/0093735 | A1 * | 5/2005 | Samukawa et al. | 342/70 |
| 2005/0270225 | A1 * | 12/2005 | Tokoro | 342/70 |

FOREIGN PATENT DOCUMENTS

| | | |
|---|---|---|
| JP | A 2003-44995 | 2/2003 |
| JP | A 2004-184332 | 7/2004 |
| JP | A 2004-191131 | 7/2004 |
| JP | A 2004-198323 | 7/2004 |
| JP | A 2004-301718 | 10/2004 |

* cited by examiner

OBJECT DETECTION DEVICE

TECHNICAL FIELD

The present invention relates to an object detection apparatus which detects objects based on a plurality of position detection results.

BACKGROUND ART

In recent years, driving support apparatuses such as collision-reduction apparatuses, inter-vehicle distance control apparatuses and follow-up traveling apparatuses have been developed. It is important for these driving support apparatuses to detect a vehicle traveling in front of a host vehicle. Among the object detection apparatuses, there is an apparatus having two detection means in order to improve detection accuracy: detection means that uses radar and detection means that uses images captured by a stereo camera or the like (see Japanese Unexamined Published Patent Application No. 2003-44995, for example). In the object detection apparatus with these two detection means, a radar-detected object detected based on radar information is checked against an image-detected object detected based on image information, judgment is made as to whether the radar-detected object and the image-detected object are the same object, and the objects judged to be identical are set as a detected object, such as a vehicle in front of the host vehicle. Particularly in the apparatus described in the above patent literature, of a plurality of detection points detected by the radar, adjacent detection points that are away from the host vehicle at substantially equal distance are grouped together into a row of dots to represent these detection points as one object, and the grouped row of dots is taken as a laser-detected object.

DISCLOSURE OF THE INVENTION

However, the size of the detected object varies depending on the type of the detected object, e.g., an automobile or a person. Therefore, when integrating a plurality of detection results in the same search area regardless of the type of the object, an excessive number of detection results might be integrated, which can possibly lead to estimation of the object to be larger than it actually is. For example, in the abovementioned object detection apparatus, in the case of performing grouping processing in the same search area, when different objects exist adjacent to each other and away from the host vehicle at substantially equal distance (for example, when a pedestrian passes by a tree or a motorcycle travels parallel to an automobile), these different objects are grouped together into a row of dots to represent these different objects as one object.

Therefore, it is an object of the present invention to provide an object detection apparatus capable of detecting objects at high precision in accordance with the types of the objects.

An object detection apparatus of the present invention has object position detection means for detecting the positions of objects, object type estimating means for estimating the types of the objects, and object estimating means for integrating a plurality of detection results for positions within a search area obtained by the object position detection means and thereby estimating the sizes of the objects, wherein the search area is set based on the types of the objects estimated by the object type estimating means.

In this object detection apparatus, the object position detection means detects the positions of objects to acquire the plurality of position detection results. Then, in the position detection apparatus, the types of the objects detected by the object type estimating means are estimated and the search area is set based on the estimated types. Furthermore, in the object position detection apparatus, the object estimating means integrates the plurality of position detection results within the search area and estimates the sizes of the objects based on the plurality of position detection results. The sizes of the objects vary depending on the types thereof (e.g., a person or an automobile). For this reason, in order to detect certain objects at high precision, the sizes of the objects obtained by integrating the plurality of position detection results need to be estimated as appropriate sizes corresponding to the types of the objects. Therefore, in this object detection apparatus, the sizes of the objects obtained by integrating the plurality of position detection results are restricted for each of the types of the objects by setting the search area according to the types of the objects. As a result, the object can be detected according to the types of the objects at high precision, without integrating an excessive number of position detection results to estimate the object as a large object.

It should be noted that the object position detection means may be constituted by one detection means, and the plurality of position detection results may be acquired by this one detection means. Alternatively, the object position detection means may be constituted by a plurality of detection means, and the position detection results detected by the plurality of detection means, respectively, may be acquired. Each size of the object may be any one of the size in a horizontal direction, the size in a depth direction, and the size in a height direction of the object, a combination of two of these sizes (size in two dimension), or a combination of all three sizes (size in three dimension).

The object detection apparatus of the present invention may be configured such that the object position detection means detects the positions of the objects by using a plurality of position detection criteria, that the object type estimating means estimates the types of the objects based on the position detection criteria, according to which the object position detection means has been able to detect the positions of the objects, and that the search area is set based on the position detection criteria, according to which the positions of the objects have been detected.

In this object detection apparatus, the object position detection means detects the positions of the objects by using the plurality of position detection criteria. Also, in the object detection apparatus, the object type estimating means estimates the types of the objects based on the position detection criteria used for detecting the positions of the objects, for each object detected by the object position detection means. Therefore, because the search area is set based on the types of the objects, it is set based on the position detection criteria used for detecting the positions of the objects. For example, in the case in which an automobile and a pedestrian are to be detected, the automobile position detection criteria and the pedestrian position detection criteria are set in the object position detection means. When the position of an object is detected by the object position detection means using the pedestrian position detection criteria, the object type estimating means estimates the type of the object to be a pedestrian, and a search area is set based on the size of the pedestrian (<a search area based on the size of an automobile). Therefore, the size of the object that is obtained from the plurality of position detection results integrated in this search area is equal to or smaller than the size of the search area considering the size of the pedestrian, but does not significantly exceed the size of the pedestrian. In this manner, in this object detection apparatus, the position detection criteria linked to the types of the objects are provided so as to be able to estimate the types of the objects easily (consequently, the search area can be set easily for each type of object).

The abovementioned object detection apparatus of the present invention may be configured such that the object position detection means is a radar sensor that receives reflected waves of scanning electromagnetic waves from the objects to detect the positions of the objects and an image sensor that analyzes captured images to detect the positions of the objects, that the object estimating means integrates a detection result for a position within the search area obtained by the radar sensor, with a detection result for a position within the search area obtained by the image sensor, the radar sensor detects the positions of the objects by using the plurality of position detection criteria, the positions of the objects are positions of the objects in the horizontal direction, and that the search area is set based on the positions of the objects detected by the radar sensor and based on the position detection criteria, according to which the radar sensor has been able to detect the objects.

In this object detection apparatus, the radar sensor uses the plurality of position detection criteria to detect the positions of the objects (at least the positions in the horizontal direction) based on radar information. Moreover, in the object detection apparatus, the image sensor detects the positions of the objects (at least the positions in the horizontal direction) based on the captured images. In addition, in the object detection apparatus, for each of the objects detected by the radar sensor, the type of the each object is estimated based on the position detection criteria used for detecting the position of the object, and the search area is set based on the position of the object in the horizontal direction that is detected by the radar sensor and based on the position detection criteria used for detecting the position of the object. Moreover, in the object detection apparatus, the object estimating means integrates the position detection result obtained based on the radar information within each set search area and the position detection result obtained based on the captured images, and estimates the sizes of the objects in the horizontal direction by means of the plurality of the position detection results. In this manner, in the object detection apparatus, the radar sensor detects the positions of the objects by using the plurality of position detection criteria so that the search area can be set easily for each type of object, and that the sizes of the objects in the horizontal direction can be estimated at high precision by using the radar information and the captured images.

The abovementioned object detection apparatus of the present invention may be configured such that the position detection criteria used by the radar sensor are represented as threshold values of reception intensity obtained when receiving the reflected waves of the scanning electromagnetic waves from the objects, and that the search area is set larger when the objects are detected with a threshold value of large reception intensity than when the objects are detected with a threshold value of small reception intensity.

In this object detection apparatus, the radar sensor receives the reflected waves of the scanning electromagnetic waves from the objects, and the reception intensity is determined based on each of the plurality of position detection criteria (threshold values). Then, the search area is set by the object detection apparatus to be larger for the object detected with the threshold value of the large reception intensity than the object detected with the threshold value of the small reception intensity. Here, the position detection criteria are set based on the reflectance property of each type of object of the electromagnetic waves, hence a high reception intensity threshold value is set for the object having high reflectivity to the electromagnetic waves, and a small reception intensity threshold value is set for the object having low reflectivity to the electromagnetic waves. Moreover, not the object having low reflectivity to the electromagnetic waves but the object having high reflectivity are assumed to be the objects having high reflectivity to the electromagnetic waves, and a large search area is set therefor. For example, an automobile corresponds to the object having high reflectivity to the electromagnetic waves, and a pedestrian (person) corresponds to the object having low reflectivity to the electromagnetic waves. Therefore, in this object detection apparatus the search area can be set easily for each type of object by taking advantage of the fact that the reception intensity of the electromagnetic waves is different for each type of object.

BEST MODE FOR CARRYING OUT THE INVENTION

An embodiment of the object detection apparatus according to the present invention will be described hereinafter with reference to the drawings.

In the present embodiment, the object detection apparatus according to the present invention is applied to a collision-reduction apparatus mounted in a vehicle. The collision-reduction apparatus according to the present embodiment detects an automobile or pedestrian in front as a detected matter, and performs various control for preventing/reducing collision with the detected object. Particularly, the collision-reduction apparatus according to the present embodiment has two detection means, i.e., millimeter wave radar and a stereo camera, for detecting a front object, and thereby detects a front object by checking an object detected by the millimeter wave radar against an object detected by the stereo camera.

Figure 1:
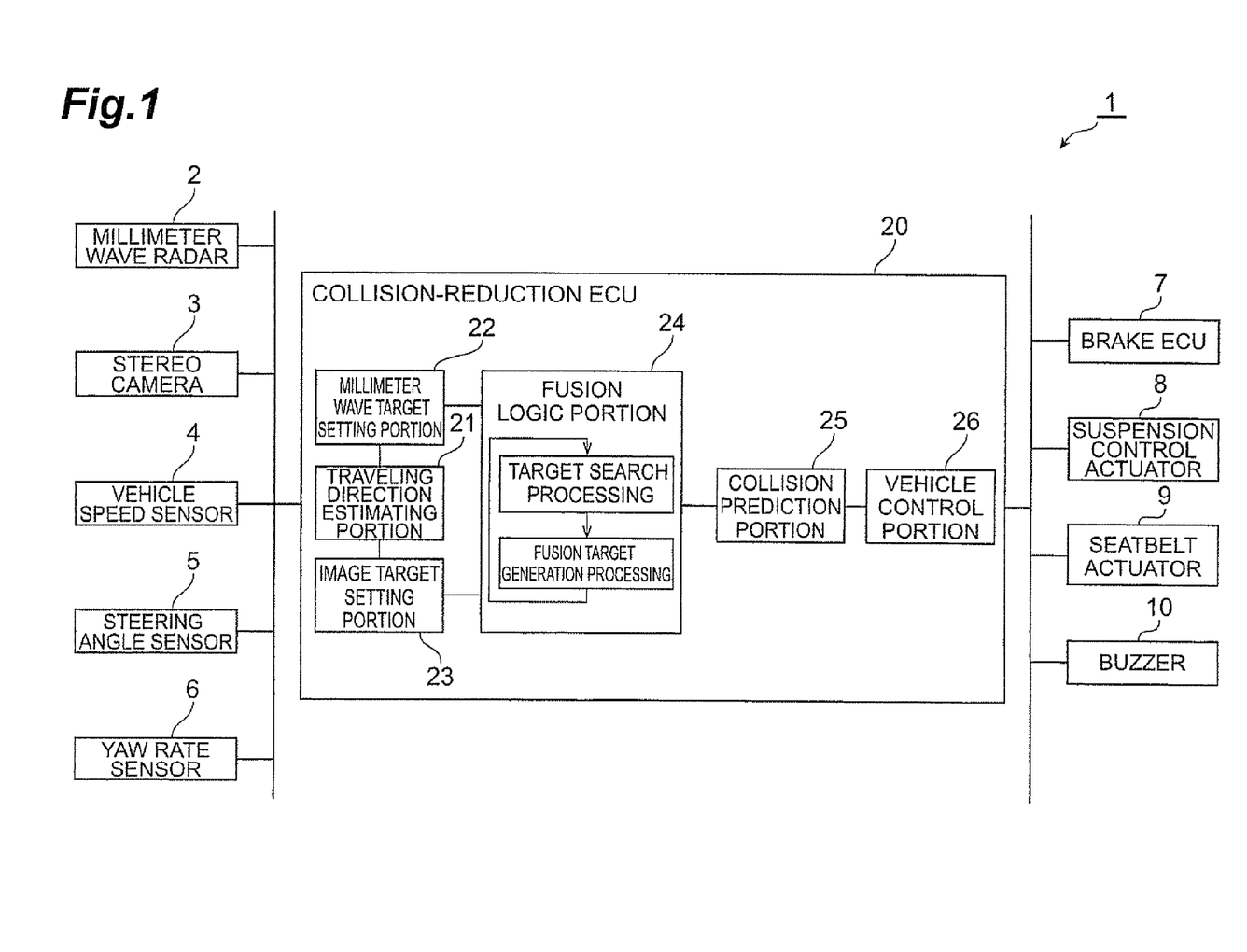
FIG. 1 is a configuration diagram of a collision-reduction apparatus according to a present embodiment.
Figure 2:
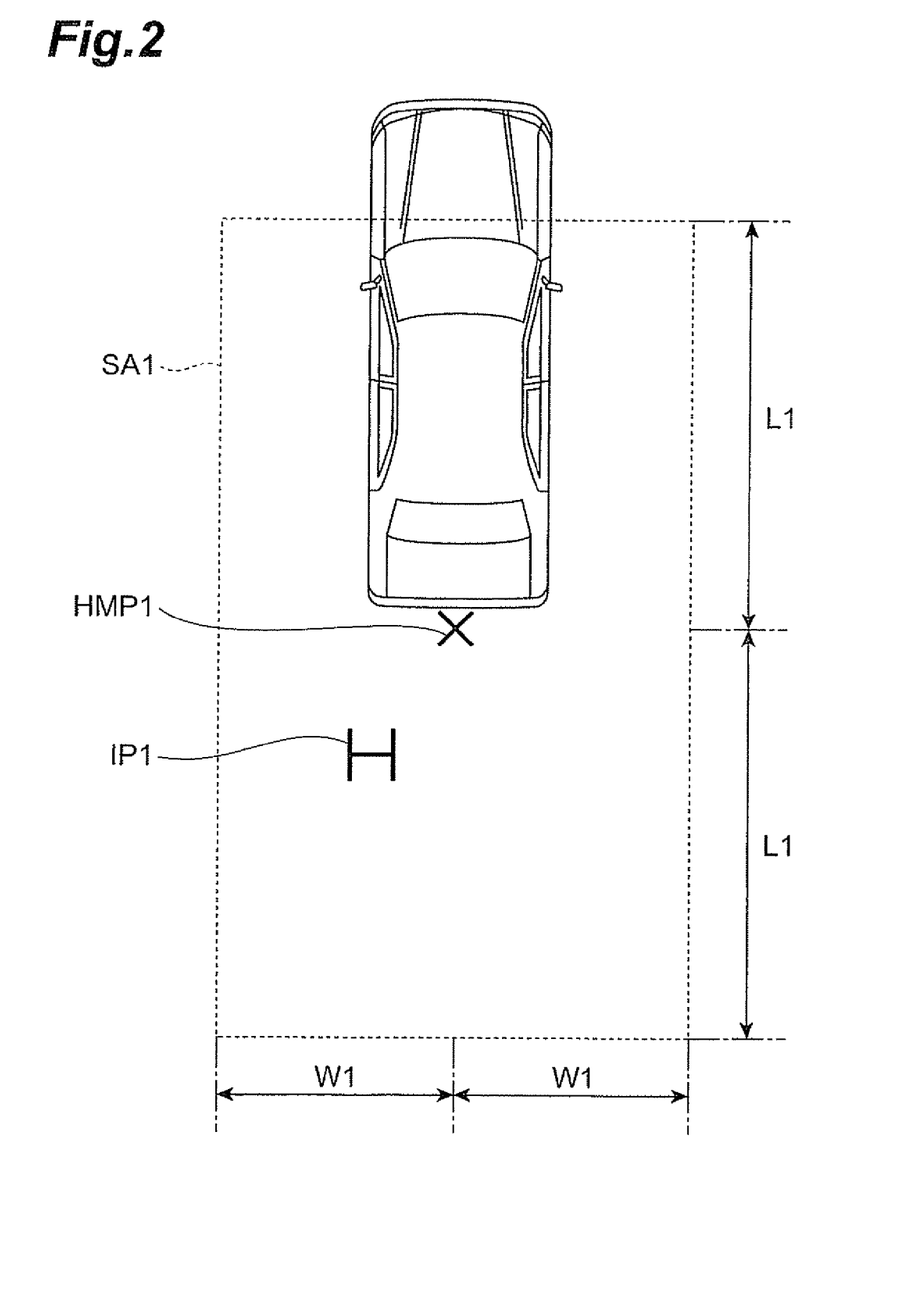
FIG. 2 shows a search range set with respect to a high-threshold value millimeter wave target.
Figure 3:
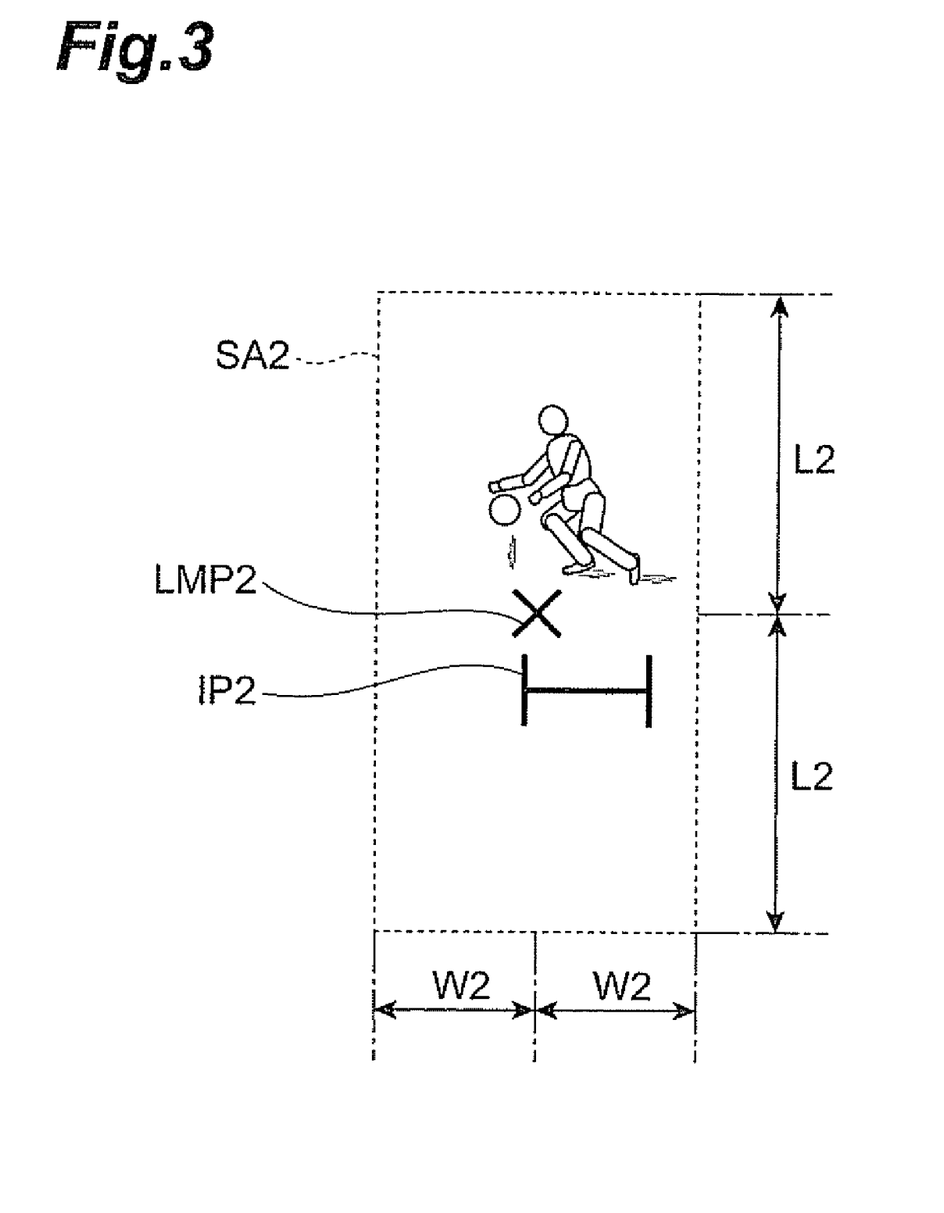
FIG. 3 shows a search range set with respect to a low-threshold value millimeter wave target.

The collision-reduction apparatus 1 will now be described with reference to FIG. 1 through FIG. 3. FIG. 1 is a configuration diagram of the collision-reduction apparatus according to the present embodiment. FIG. 2 shows a search range set with respect to a high-threshold value millimeter wave target. FIG. 3 shows a search range set with respect to a low-threshold value millimeter wave target.

The collision-reduction apparatus 1 detects an object (automobile, pedestrian) in front, and performs brake control, suspension control, seatbelt control and alert control according to the possibility of collision when the object is detected. In order to detect the front object, the collision-reduction apparatus 1 sets a millimeter wave target based on millimeter wave radar information, sets an image target based on stereo images obtained by the stereo camera, and sets a fusion target by checking the millimeter wave target against the image target. In this checking process, the type of the detected object is estimated in accordance with two threshold values used for detecting a millimeter wave target, and the millimeter wave target and the image target existing within a search range (search area) corresponding to the estimated type are integrated to set a fusion target. The collision-reduction apparatus 1 has millimeter wave radar 2, a stereo camera 3, a vehicle speed sensor 4, a steering angle sensor 5, a yaw rate sensor 6, a brake ECU [Electric Control Unit] 7, a suspension control actuator 8, a seatbelt actuator 9, a buzzer 10, a collision-reduction ECU 20, and the like, and these components transmit/receive various signals through CAN [Controller Area Network] (standard interface standard for a vehicle LAN) communication.

First, each of the targets will now be described. The millimeter wave target is an object detected based on information obtained by the millimeter wave radar 2. The distance to an object that can be acquired from radar information and the horizontal position of the object are set as millimeter wave target information. The image target is an object detected based on stereo images obtained by the stereo camera 3. The distance to an object that can be acquired from the stereo images and the horizontal position of the object (information including the horizontal width of the object) are set as image target information. The fusion target is an object for which it is judged that the millimeter wave object and the image object are the same object, the object being an object obtained by integrating the millimeter wave target and the image target existing within the same search range. The distance obtained by the millimeter wave target information and the horizontal position obtained by integrating the millimeter wave target information and the image target information (information including the horizontal width) are set in the fusion target. The horizontal position takes a position in the central position of a host vehicle in the vehicle width direction as a reference position, this position being a position in the traveling direction of the host vehicle, with the traveling direction in the central position being taken as zero, positions to the right of the horizontal direction being positive values and positions to the left of the horizontal direction being negative values. The position of each of the targets can be defined as a position relative to the host vehicle by the distance and horizontal position. Note that relative speed and the like may be additionally set as the millimeter wave target information, and the depth of the object, the height and height position of the object, relative speed or the like may be additionally set as the image target information. In response to this, other information may be set as the fusion target information.

The millimeter wave radar 2 is radar for detecting an object using millimeter waves. The millimeter wave radar 2 is attached to the center of the front side of the host vehicle. The millimeter wave radar 2 transmits millimeter waves forward from the host vehicle while scanning the millimeter waves within a horizontal plane, and receives reflected millimeter waves. Then, the millimeter wave radar 2 then transmits transmitted/received data of the millimeter waves as radar signals to the collision-reduction ECU 20. The transmitted/received data includes information on the transmitted millimeter waves (transmission angle with the traveling direction of the host vehicle set as a center, the time of transmission, and the like), information as to whether the reflected waves corresponding to the transmitted millimeter waves could have been received or not, and any received information obtained from the reflected waves when the reflected waves are received (reception angle, reception time, reception intensity and the like). The reception intensity corresponds to the level of reflection of the millimeter waves and represents reflectance property of the object that reflects the millimeter waves.

The stereo camera 3 consists of two CCD [Charge Coupled Device] cameras, which are disposed horizontally with a predetermined distance therebetween. The stereo camera 3 is attached to the center of the front side of the host vehicle. The stereo camera 3 transmits data of right and left stereo images captured by the two CCD cameras to the collision-reduction ECU 20 as image signals.

The vehicle speed sensor 4 is a sensor for detecting the speed of the host vehicle. The vehicle speed sensor 4 transmits a detection value of the detected speed as a vehicle speed signal to the collision-reduction ECU 20. The steering angle sensor 5 is a sensor for detecting a steering angle of the steering wheel. The steering angle sensor 5 transmits a detection value of the detected steering angle as a steering angle signal to the collision-reduction ECU 20. The yaw rate sensor 6 is a sensor for detecting a yaw rate (rotation angle speed) of the host vehicle. The yaw rate sensor 6 transmits a detection value of the detected yaw rate as a yaw rate signal to the collision-reduction ECU 20.

The brake ECU 7 is an ECU for adjusting the hydraulic pressure of the wheel cylinders of the four wheels to control the brake force of the four wheels. The brake ECU 7 sets hydraulic control signals on the basis of target brake force for each wheel, and transmits each of the hydraulic control signals to a brake control actuator that changes the hydraulic pressure of each wheel cylinder. Particularly, when the brake ECU 7 receives target brake force signals for the respective wheels from the collision-reduction ECU 20, the brake ECU 7 sets the hydraulic control signals on the basis of the target brake forces indicated by the target brake force signals. Incidentally, when the hydraulic control signals are received, the brake control actuator changes the hydraulic pressure of each wheel cylinder on the basis of target hydraulic pressure indicated by the hydraulic control signals.

The suspension control actuator 8 is an actuator for changing the hydraulic pressure of hydraulic active suspensions of the four wheels. When the suspension control actuator 8 receives target damping force signals for the respective wheel from the collision-reduction ECU 20, the suspension control actuator 8 sets target hydraulic pressure on the basis of target damping force indicated by each target damping force signal to change the hydraulic pressure of the hydraulic active suspension on the basis of the target hydraulic pressure. Although FIG. 1 illustrates only one suspension control actuator 8, the suspension control actuator 8 is provided in each of the suspensions of the four wheels.

The seatbelt actuator 9 is an actuator for drawing in the seatbelts and changing the restraining force of the seatbelts. When the seatbelt actuator 9 receives target drawing-amount signals for the respective seatbelts from the collision-reduction ECU 20, the seatbelt actuator 9 draws in the seatbelts in accordance with target drawing amount indicated by the target drawing-amount signals. Although FIG. 1 illustrates only one seatbelt actuator 9, the seatbelt actuator 9 is provided in each of the seatbelts.

The buzzer 10 outputs a buzzing sound when it receives an alert signal from the collision-reduction ECU 20.

The collision-reduction ECU 20 is an electronic control unit configured by a CPU [Central Processing Unit], ROM [Read Only Memory], RAM [Random Access Memory] and the like, and performs overall control of the collision-reduction apparatus 1. The collision-reduction ECU 20 is configured by a traveling direction estimating portion 21, a millimeter wave target setting portion 22, an image target setting portion 23, a fusion logic portion 24, a collision prediction portion 25 and a vehicle control portion 26. The collision-reduction ECU 20 receives the radar signals from the millimeter wave radar 2 and the image signals from the stereo camera 3, and further receives the vehicle speed signal from the vehicle speed sensor 4, the steering angle signal from the steering angle sensor 5, and the yaw rate signal from the yaw rate sensor 6. Then, the collision-reduction ECU 20 processes the portions 21 through 26 using these signals at regular time intervals based on a master clock of the CPU to detect the front automobile or pedestrian, and controls the brake ECU 7, suspension control actuator 8, seatbelt actuator 9 and buzzer 10 in accordance with the possibility of collision with the detected object.

Note that in the present embodiment, the millimeter wave radar 2 and the millimeter wave target setting portion 22 correspond to a radar sensor (object position detection means) described in the patent claims, the stereo camera 3 and the image target setting portion 23 to an image sensor (object position detection means) described in the patent claims, and the fusion logic portion 24 corresponds to object type estimating means and object estimating means described in the patent claims.

The traveling direction estimating portion 21 will now be described. The collision-reduction ECU 20 estimates the traveling direction of the host vehicle on the basis of the vehicle speed, steering angle and yaw rate thereof. Although the traveling direction is obtained by using the vehicle speed, steering angle and yaw rate, the traveling direction may be obtained using only part of such vehicle information, or by using other vehicle information.

The millimeter wave target setting portion 22 will now be described. In order to determine whether there is an object in front, the collision-reduction ECU 20 has a high-threshold value and a low-threshold value as threshold values for determining the reception intensity of the reflected waves of the millimeter waves. The high-threshold value is a threshold value for detecting an object having a high reflectivity to the millimeter waves and is also a threshold value on the basis of which an automobile is mainly assumed to be the detected matter. The low-threshold value is a threshold value for detecting an object having low reflectivity to the millimeter waves and is also a threshold value on the basis of which a pedestrian is mainly assumed to be the detected matter. Thus, the type of the detected object can be estimated based on whether the millimeter wave target is detected with the high-threshold value or the low-threshold value. The high-threshold value and low-threshold value are set beforehand by experiment using the millimeter wave radar detecting an automobile or a person as the detected matter, and kept in the collision-reduction ECU 20.

The collision-reduction ECU 20 determines whether or not the reception intensity is higher than the high-threshold value. When the reception intensity is higher than the high-threshold value (when an object having high reflectivity to the millimeter waves exists in front), the collision-reduction ECU 20 sets a high-threshold value millimeter wave target by means of the transmitted/received data of the millimeter waves that shows the reception intensity higher than the high-threshold value. When the reception intensity is equal to or lower than the high-threshold value, the collision-reduction ECU 20 determines whether or not the reception intensity, which is equal to or lower than the high-threshold value, is higher than the low-threshold value. When the reception intensity is higher than the low-threshold value (when an object having low reflectivity to the millimeter waves exists in front), the collision-reduction ECU 20 sets a low-threshold value millimeter target by means of the transmitted/received data of the millimeter waves that shows the reception intensity higher than the low-threshold value. When the reception intensity is equal to or lower than the low-threshold value, the reception intensity is equivalent to the noise level, which is not detected as the object. In the object detection performed by the millimeter wave radar 2, an object is detected when a millimeter wave having the reception intensity higher than the high-threshold value or low-threshold value can be detected, hence one millimeter wave target is obtained each time a millimeter wave higher than the high-threshold value or low-threshold value is received.

When setting the high-threshold value millimeter wave target or the low-threshold value millimeter wave target, the distance to the front object is calculated in the collision-reduction ECU 20 based on the time taken between emission and reception of the millimeter waves indicating the reception intensity higher than the high-threshold value or low-threshold value. Moreover, the collision-reduction ECU 20 detects the direction of the reflected waves having the reception intensity higher than the high-threshold value or low-threshold value, obtains, from this direction, the angle formed by the traveling direction of the host vehicle and the direction of the object, and calculates the horizontal position of the object from this angle (position in the central position of the host vehicle in the vehicle width direction, the position being in the horizontal direction on the traveling direction of the host vehicle). The distance and horizontal position are the millimeter wave target information.

The image target setting portion 23 will now be described. The collision-reduction ECU 20 uses a difference in vision of the object between the right and left stereo images to identify the front object by means of triangulation, and sets the image target when the object can be identified. When setting the image target, the collision-reduction ECU 20 calculates the distance between the stereo camera 3 and the object and the horizontal position of the object on the basis of the stereo images. The distance and horizontal position are the image target information. Particularly the horizontal position is the information that includes the horizontal width of the object and indicates the range in the horizontal direction in which the object can be detected by the stereo camera 3. In detection of an object by means of the stereo camera 3, an object is detected when it is identified based on the right and left stereo images thereof, and thus one image target is obtained each time an object is identified.

The fusion logic portion 24 will now be described. When the high-threshold value millimeter wave target is detected by the millimeter wave target setting portion 22, the collision-reduction ECU 20 estimates that the object to be set as the fusion target is an automobile, and sets a search range of $\pm L1$ in the distance direction and $\pm W1$ in the horizontal direction relative to the central position taken as the distance and horizontal position that are set in the high-threshold value millimeter wave target (see FIG. 2). Since the millimeter wave target that is detected with the high-threshold value is assumed mainly to be an automobile, a range that sufficiently includes a wide and long automobile is set as the search range. This high-threshold value search range is set beforehand in consideration of the average size of automobiles and kept in the collision-reduction ECU 20. Then, the collision-reduction ECU 20 determines whether any of the image targets detected by the image target setting portion 23 has the position of the image target (distance and horizontal position) within the high-threshold value search range. When there is an image target included within this search range, the collision-reduction ECU 20 determines that there is similarity between the high-threshold value millimeter wave target and the image target, and thus judges that the high-threshold value millimeter wave target and the image target are the same object.

On the other hand, when the millimeter wave target setting portion 22 detects the low-threshold value millimeter wave target, the collision-reduction ECU 20 estimates that the object to be set as the fusion target is a pedestrian, and sets a search range of ±L2 in the distance direction and ±W2 in the horizontal direction relative to the central position taken as the distance and horizontal position that are set in the low-threshold value millimeter wave target (see FIG. 3). Since the millimeter wave target that is detected with the low-threshold value is assumed mainly to be a pedestrian, a range that is sufficiently smaller than the search range for the high-threshold value millimeter wave target and sufficiently includes a pedestrian is set as the search range. Therefore, L1>L2 and W1>W2 are satisfied. This low-threshold value search range is set beforehand in consideration of the average size of pedestrians and kept in the collision-reduction ECU 20. Then, the collision-reduction ECU 20 determines whether any of the image targets detected by the image target setting portion 23 has the position of the image target (distance and horizontal position) within the low-threshold value search range. When there is an image target included within this search range, the collision-reduction ECU 20 determines that there is similarity between the low-threshold value millimeter wave target and the image target, and judges that the low-threshold value millimeter wave target and the image target are the same object.

When the high-threshold value millimeter wave target and the image target are judged as the same object or the low-threshold value millimeter wave target and the image target are judged as the same object, the collision-reduction ECU 20 generates the fusion target by integrating the millimeter wave target information and the image target information that are judged as the same object. The distance of the millimeter wave target is set, as is, as the distance used as the fusion target information. Of the horizontal position of the millimeter wave target and the horizontal position of one or a plurality of image targets, a horizontal position having right and left edges on both edges is set as the horizontal position used as the fusion target information. Therefore, this horizontal position is information that includes the horizontal width of the object and indicates the widest horizontal direction range over which the object can be detected by the millimeter wave radar 2 and the stereo camera 3.

Note that when the search range includes a plurality of image targets, the plurality of image targets and the millimeter wave target are judged as the same object. It is highly likely that the fusion target obtained by fusing the high-threshold value millimeter wave target with the image target is an automobile, and the horizontal width to be set does not exceed the lateral width (=W1×2) of the high-threshold value search range. It is highly likely that the fusion target obtained by fusing the low-threshold value millimeter wave target with the image target is a pedestrian, and the horizontal width to be set does not exceed the horizontal width (=W2×2) or the low-threshold value search range.

In the example shown in FIG. 2, a search range SA1 is set with a high-threshold value millimeter wave target HMP1 at the center, and one image target IP1 exists within this search range SA1. Therefore, it is judged that the high-threshold value millimeter wave target HMP1 and the image target IP1 are the targets that detected the same object (automobile), and, as the fusion target, the distance of the high-threshold value millimeter wave target HMP1 is set, as well as the horizontal position in which the horizontal position of the high-threshold value millimeter wave target IP1 is the right edge and the horizontal position of the image target IP1 is the left edge.

In the example shown in FIG. 3, a search range SA2 is set with a low-threshold value millimeter wave target LMP2 at the center, and one image target IP2 exists within this search range SA2. Therefore, it is judged that the low-threshold value millimeter wave target LMP2 and the image target IP2 are the targets that detected the same object (pedestrian), and, as the fusion target, the distance of the low-threshold value millimeter wave target LMP2 is set, as well as a horizontal position in which both edges thereof are configured by the right and left edges of the horizontal position of the image target IP2. Note that an H-shaped mark representing the image target in FIG. 2 and the like shows the horizontal width that has the horizontal direction length and is set in the image target. In the case of FIG. 2, only the left edge side of the automobile is detected for the image target IP1, while in the case of FIG. 3 the entire width of the pedestrian is detected for the image target IP2.

Figure 4:
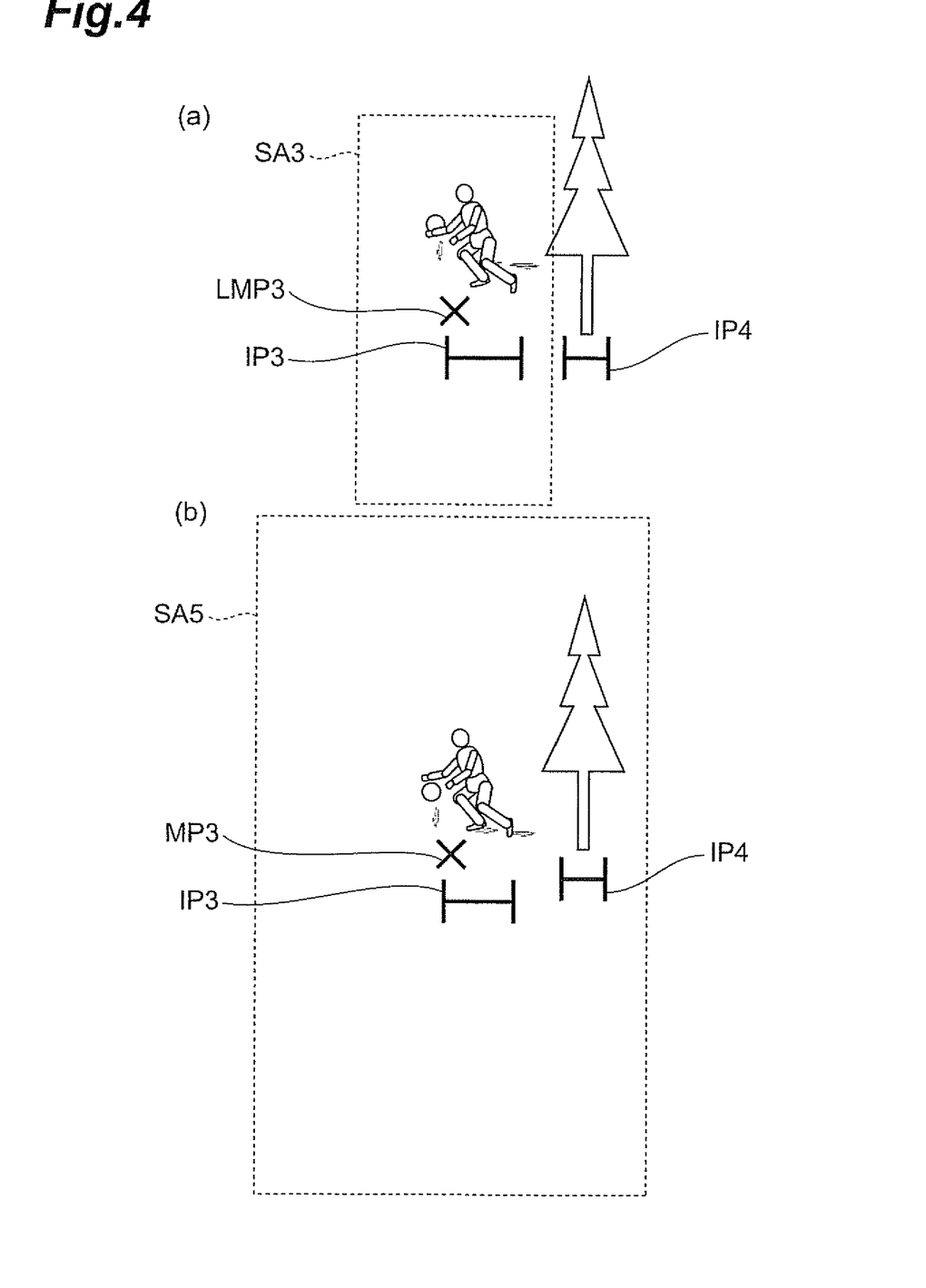
FIG. 4 shows a comparative example of search ranges set with respect to a pedestrian, with (a) showing a low-threshold value search range and (b) showing a high-threshold value search range.

The example of FIG. 4 shows a case in which a pedestrian exists near a tree and a search range is set with respect to the millimeter wave target that detects the pedestrian. In (a) of FIG. 4, which shows search processing performed by the collision-reduction ECU 20, the low-threshold value search range SA3 is set for a low-threshold value millimeter wave target LMP3 that detects the pedestrian, and only an image target IP3 that detects the pedestrian exists within this narrow search range SA3. Therefore, the low-threshold value millimeter wave target LMP3 and the image target IP3 are integrated with each other to obtain the fusion target. In this case, an image target IP4 that detects the tree is not integrated as the fusion target since the image target IP4 does not exist within the search range SA3. As a result, a horizontal position in which both edges thereof are configured by the right and left edges of the horizontal position of the image target IP3 is set as the horizontal position of the fusion target, and this horizontal position has appropriate horizontal width for the pedestrian. On the other hand, in (b) of FIG. 4, which shows a case in which the search range is applied to the high-threshold value search range, a high-threshold value search range SA5 is set with respect to the millimeter wave target MP3 that detects the pedestrian, and not only the image target IP3 that detects the pedestrian but also the image target IP4 that detects the tree exist within this wide search range SA5. Therefore, the millimeter wave target MP3 is integrated with the image target IP3 and image target IP4 to obtain the fusion target. As a result, a horizontal position in which both edges thereof are configured by the left edge of the horizontal position of the image target IP3 and the right edge of the horizontal position of the image target IP4 is set as the horizontal position of the fusion target, and this horizontal position has extremely wide width for the pedestrian.

Figure 5:
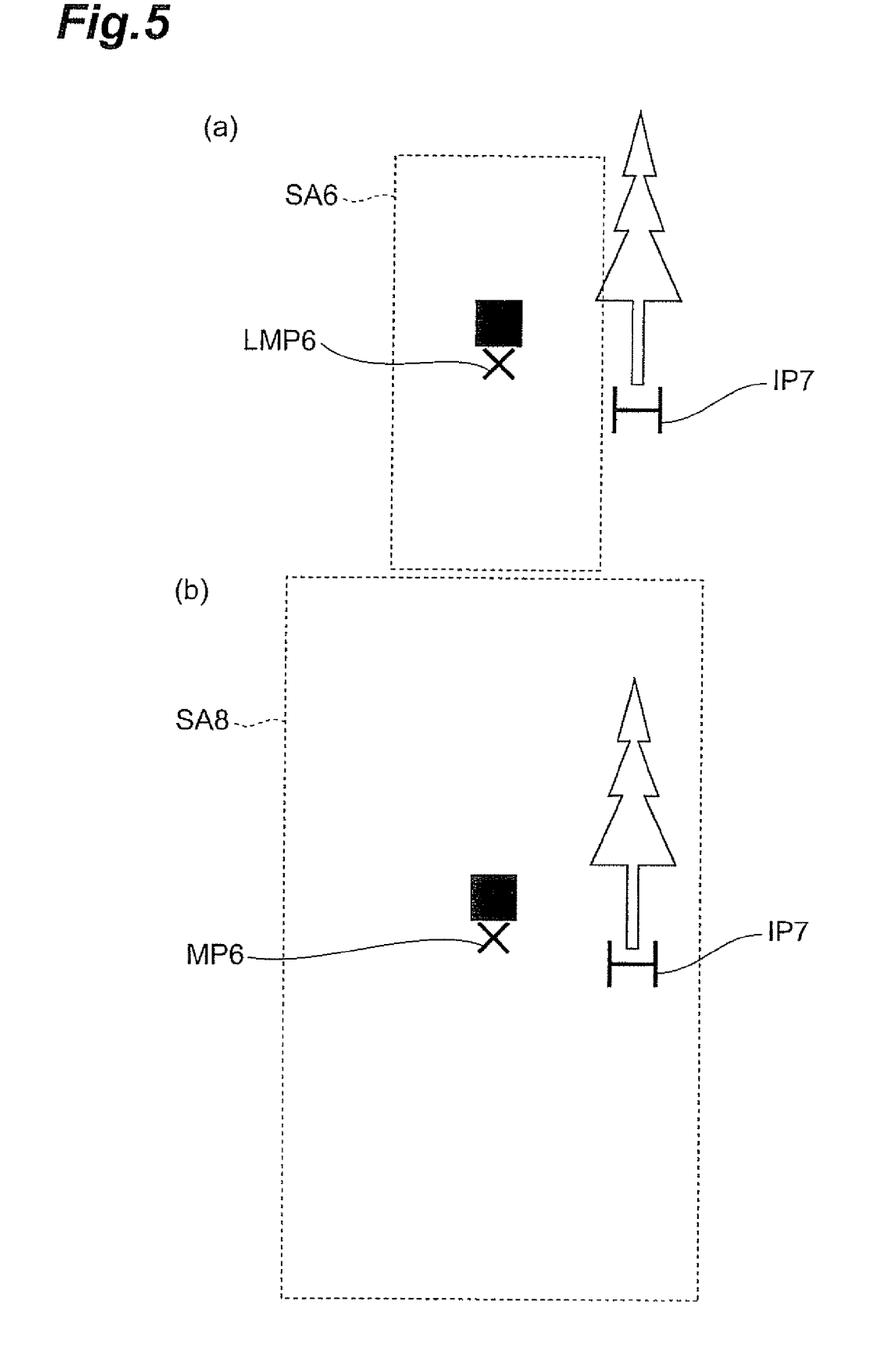
FIG. 5 shows a comparative example of search ranges set with respect to a street metal plate, with (a) showing a low-threshold value search range and (b) showing a high-threshold value search range.

The example of FIG. 5 shows a case in which a tree exists near a street metal plate, and a search range is set with respect to a millimeter wave target that detects the metal plate. The metal plate cannot be detected using stereo images, hence no image target is set. In (a) of FIG. 5, which shows search processing performed by the collision-reduction ECU 20, a low-threshold value search range SA6 is set with respect to a low-threshold value millimeter wave target LMP6 that detects the metal plate, and no image target exists in this narrow search range SA6. Therefore, no fusion target is set. In this case, an image target IP7 that detects the tree is not integrated as the fusion target since the image target IP7 does not exist within the search range SA6. On the other hand, in (b) of FIG. 5, which shows a case in which the search range is applied to the high-threshold value search range, a high-threshold value search range SA8 is set with respect to the millimeter wave target MP6 that detects the metal plate, and the image target IP7 that detects the tree exists within this wide search range SA8. Therefore, the millimeter wave target MP6 and the image target IP7 are integrated with each other to obtain the fusion target. As a result, a horizontal position in which both edges thereof are configured by the right edges of the horizontal position of the millimeter wave target MP6 and of the horizontal position of the image target IP7 is set as the horizontal position of the fusion target, and this horizontal position has extremely wide width for the metal plate.

In this manner, when the search range is expanded against the size of the object to be detected, an image target other than the detected matter is also sometimes included in the search range. For this reason, there is a possibility that the image target with which the other object is detected is integrated as the fusion target, whereby the horizontal width larger than that of the object to be detected is set as the size of the fusion target. However, an appropriate search range is set in the collision-reduction ECU 20 in consideration of the size of the object to be detected so that an image target other than the detected matter is prevented from being included in the search range as much as possible. Therefore, only the image target with which the object to be detected is detected is very likely to be integrated as the fusion target, and thereby the horizontal width corresponding to the object to be detected is set as the size of the fusion target.

The collision prediction portion 25 will now be described. When the fusion target is set (specifically, when there is an automobile or other object in front), the collision-reduction ECU 20, considering the vehicle speed, sets the levels of possibility of collision (e.g., three levels of high, low, or no possibility) based on the distance to the front object that is set in the fusion target. Note that when a relative speed is set as the fusion target information, the distance to the front of the object is divided by the relative speed to obtain TTC [Time To Collision], and then the levels of possibility of collision may be set based on this TTC.

The vehicle control portion 26 will now be described. Once the levels of possibility of collision are set, the collision-reduction ECU 20 controls the brake ECU 7, the suspension control actuator 8, . . . , the seatbelt actuator 9, . . . , and the buzzer 10 in accordance with the levels of possibility of collision. This control will be described with reference to an example in which there are three levels of possibility of collision. At the no collision possibility level, the collision-reduction ECU 20 does not control the brake ECU 7, the suspension control actuator 8, . . . , the seatbelt actuator 9, . . . , and the buzzer 10.

At the low collision possibility level, the collision-reduction ECU 20 controls the seatbelt actuator 9, . . . , and the buzzer 10 without controlling the brake ECU 7, the suspension control actuator 8, . . . . Specifically, the collision-reduction ECU 20 sets the target drawing-amount signals for slightly drawing in the seatbelts, in order to notify that the object is approaching ahead, and then transmits the target drawing-amount signals to the seatbelt actuator 9, . . . and the like (the target drawing-amount signal may be transmitted only to the seatbelt actuator 9 of the driver's seat). The collision-reduction ECU 20 further sets the alert signal in order to notify that the object is approaching ahead, and then transmits the alert signal to the buzzer 10.

At the high collision possibility level, the collision-reduction ECU 20 controls all of the brake ECU 7, the suspension control actuator 8, . . . , the seatbelt actuator 9, . . . , and the buzzer 10. Specifically, the collision-reduction ECU 20 sets the target brake force signals in order to reduce the vehicle speed, and then transmits the target brake force signals to the brake ECU 7. The collision-reduction ECU 20 further sets the target damping force signals for preventing the vehicle from tilting (preventing the front part of the vehicle from descending), and transmits the target damping force signals to the suspension control actuator 8, . . . . The collision-reduction ECU 20 further sets the target drawing-amount signals for strongly restraining passengers and then transmits the target drawing-amount signals to the seatbelt actuator 9, . . . . The collision-reduction ECU 20 further sets the alert signal in order to notify that a vehicle is approaching ahead, and then transmits the alert signal to the buzzer 10.

As the fusion target in which the low-threshold value millimeter wave target is integrated, a pedestrian is assumed to be the front object, and as the fusion target in which the high-threshold value millimeter wave target is integrated, an automobile is assumed to the front object, hence control performed by the vehicle control portion 26 may be changed according to the type of the assumed front objects. Furthermore, because appropriate horizontal width corresponding to the type of the front object (pedestrian or automobile) is set as the horizontal width information of the fusion target, the amount of overlapping with the front object or the like may be obtained, and the control may be performed by the vehicle control portion 26 in consideration of this other information.

The operations of the collision-reduction apparatus 1 will now be described with reference to FIG. 1 through FIG. 3.

The millimeter wave radar 2 transmits millimeter waves forward and receives reflected waves thereof while scanning the millimeter waves, and transmits transmitted/received data thereof as the radar signals to the collision-reduction ECU 20. The stereo camera 3 captures images of the front and transmits the captured right and left stereo images as the image signals to the collision-reduction ECU 20. The vehicle speed sensor 4 detects the vehicle speed of the host vehicle and transmits thus obtained detection value thereof as the vehicle speed signal to the collision-reduction ECU 20. The steering angle sensor 5 detects a steering angle of the steering wheel and transmits thus obtained detection value as the steering angle signal to the collision-reduction ECU 20. The yaw rate sensor 6 detects a yaw rate acting on the host vehicle and transmits thus obtained detection value as the yaw rate signal to the collision-reduction ECU 20. The collision-reduction ECU 20 receives these signals.

The collision-reduction ECU 20 estimates the traveling direction of the host vehicle on the basis of the vehicle speed obtained from the vehicle speed signal, the steering angle obtained from the steering angle signal, and the yaw rate obtained from the yaw rate signal, at every predetermined time period.

The collision-reduction ECU 20 determines, at every predetermined time period, whether or not the reception intensity obtained from the radar information on the radar signals is higher than the high-threshold value. When the reception intensity is higher than the high-threshold value, the collision-reduction ECU 20 calculates, based on the radar information obtained from the millimeter waves of the reception intensity higher than the high-threshold value, the distance between the host vehicle and the front object and the horizontal position of the front object in relation to the center of the traveling direction of the host vehicle, and sets the high-threshold value millimeter wave target. When the reception intensity is equal to or lower than the high-threshold value, the collision-reduction ECU 20 determines whether or not the reception intensity of the millimeter waves that is obtained from the radar information of the radar signals is higher than the low-threshold value. When the reception intensity is higher than the low-threshold value, the collision-reduction ECU 20 calculates, based on the radar information on the millimeter waves of the reception intensity higher than the low-threshold value, the distance between the host vehicle and the front object and the horizontal position of the front object in relation to the center of the traveling direction of the host vehicle, and sets the low-threshold value millimeter wave target. When the reception intensity is equal to or lower than the low-threshold value, the collision-reduction ECU 20 sets no millimeter wave target.

The collision-reduction ECU 20 determines, based on the stereo image of each image signal at every predetermined time period, whether there is an object in front. When it is determined that there is an object in front, the collision-reduction ECU 20 calculates, based on the stereo image, the distance between the host vehicle and the front object and the horizontal position (horizontal width) of the front object in relation to the center of the traveling direction of the host vehicle, and sets the image target.

When the high-threshold value millimeter wave target is set, the collision-reduction ECU 20 sets the high-threshold value search range with the position of the high-threshold value millimeter wave target at the center, and searches whether there is the image target in this search range. When there is the image target within the search range, the collision-reduction ECU 20 determines that the image target and the high-threshold value millimeter wave target are the same object. The collision-reduction ECU 20 then integrates the image target information with the high-threshold value millimeter wave target information to set the distance and the horizontal position (horizontal width) and then generates the fusion target.

When the low-threshold value millimeter wave target is set, the collision-reduction ECU 20 sets the low-threshold value search range with the position of the low-threshold value millimeter wave target at the center, and searches whether there is the image target within this search range. When there is the image target within the search range, the collision-reduction ECU 20 determines that the image target and the low-threshold value millimeter wave target are the same object. The collision-reduction ECU 20 then integrates the image target information with the low-threshold value millimeter wave target information to set the distance and the horizontal position (horizontal width) and then generates the fusion target.

When the fusion target is generated, the collision-reduction ECU 20 sets the levels of possibility of collision on the basis of the information set in the fusion target. The collision-reduction ECU 20 then controls the brake ECU 7, the suspension control actuator 8, . . . , the seatbelt actuator 9, . . . , and the buzzer 10 in accordance with the levels of possibility of collision. By this control, at the low level of possibility of collision with the front object, the seatbelts are drawn in by the seatbelt actuator 9, . . . , and a buzzing sound is output by the buzzer 10 so that the driver is caused to acknowledge that the front object is approaching. Moreover, when the possibility of collision with the front object increases, the speed is reduced by the brake ECU 7 using the automatic brake force, hardness of the suspension is adjusted by the suspension control actuator 8, . . . , whereby the passengers are strongly restrained by drawing in the seatbelts more by means of the seatbelt actuator 9, . . . , and a buzzing sound is output by the buzzer 10 to cause the driver to acknowledge that the front object is approaching more. On the other hand, when the fusion target is not generated or there is no possibility of collision, the collision-reduction ECU 20 does not perform control for reducing collision.

According to this collection-reduction apparatus 1, erroneous fusion of the millimeter wave target with the image target can be prevented by estimating the type of front object (assuming a pedestrian or an automobile) based on the threshold value of the millimeter wave target and changing the size of the search range for searching the image target according to this type. Therefore, the millimeter wave target and the image target that indicate the same object can be integrated with each other so that the accurate information can be set as the fusion target. Particularly the size of the horizontal direction of the object can be estimated with a high degree of accuracy.

Moreover, according to the collision-reduction apparatus 1, the type of the front object can be estimated easily (the size of the search range can be determined easily) by setting a high-threshold value and a low-threshold value to determine the reception intensity of the millimeter waves in consideration of the reflectance property against the millimeter waves of the automobile or person and by detecting the millimeter wave target based on the two threshold values can easily estimate the type of the front object.

The above has described the embodiment according to the present invention, but the present invention is not limited to the above embodiment and is implemented in various modes.

For example, in the present embodiment is applied to the collision-reduction apparatus mounted in a vehicle, but the present invention can be applied to driving support apparatuses such as inter-vehicle distance control apparatuses and follow-up traveling apparatuses, or to other apparatuses such as perimeter monitoring apparatuses, and can be also utilized as an object detection apparatus alone. In addition, not only an automobile or a pedestrian in front, but also other objects can be detected as the detected matter. Furthermore, as for the subject to mount, the present invention can be mounted in not only a vehicle but also a robot.

Moreover, the present embodiment is configured to use the millimeter wave radar as the radar sensor, but other radar sensor such as laser radar may be used. Also, the present embodiment is configured to use the stereo camera as the image sensor, but a camera other than the stereo camera may be used. Furthermore, detection means other than the radar sensor or image sensor may be used as the object position detection means. In addition, the present embodiment is configured to use two detection means, i.e., the millimeter wave radar and the stereo camera, as the object position detection means, but only one detection means may be used. For example, when only the millimeter wave radar is used, the object may be searched from among a plurality of millimeter wave targets by the millimeter wave radar, or when only the stereo camera is used, the object may be searched from among a plurality of image targets by the stereo camera.

Although the present embodiment is configured to receive the detection signals from the vehicle speed sensor, the steering angle sensor and the yaw rate sensor, respectively, vehicle information such as the vehicle speed, steering angle and yaw rate may be acquired from other vehicle ECUs that receive the detection signals. Moreover, a curve radius obtained by the other vehicle ECUs may be acquired to estimate the traveling direction of the host vehicle from the curve radius or the like.

Although the present embodiment is configured to use the collision-reduction ECU to set the millimeter wave target based on the information obtained from the millimeter wave radar and to set the image target based on the stereo image obtained from the stereo camera, the millimeter wave sensor may be provided with the millimeter wave radar and a processor to set the millimeter wave target within the millimeter wave sensor, or the image sensor may be provided with the stereo camera and an image processor to set the image target within the image sensor.

Furthermore, the present embodiment is configured to provide a high-threshold value for an automobile and a low-threshold value for a pedestrian when detecting an object on the basis of the information obtained from the millimeter wave radar, but the object to be detected may not be limited to these, and thus an automobile, a motorcycle, a street metal plate, and other various things may apply, and a threshold value is provided for each of these objects in accordance with the reflectance property against the millimeter waves of the object to be detected.

Moreover, the present embodiment is configured to provide a high-threshold value and a low-threshold value in the millimeter wave target setting portion to estimate, whether the object to be detected is an automobile or a pedestrian, based on which one of the threshold values is used to set the target, but various methods may be used as a method for estimating the type of object based on images or the like (e.g., estimating the type of object by recognizing the object using a pattern matching method, or estimating the type of object by detecting the color of the skin or the like when color images are used).

In addition, the present embodiment is configured to estimate the types of object by comparing the reception intensity of the millimeter waves with each threshold value and then set a search range in accordance with each type, but the types of object may be estimated based on dynamic changes in the reception intensity of the millimeter waves (e.g., dispersion of the reception intensity), and the search range according to each type may be set. For example, the waves reflected to the millimeter waves are unstable in a pedestrian, hence dispensability of the reception intensity of the reflected waves is higher in the pedestrian than the automobile.

Moreover, the present embodiment is configured to set a large search range for the millimeter wave target detected with the high-threshold value and to set a small search range for the millimeter wave target detected with the low-threshold value, but a small search range is sometimes set for the millimeter wave target detected with the high-threshold value and a large search range is sometimes set for the millimeter wave target detected with the low-threshold value, according to the relationship between the reflectance property against the millimeter waves of the object and the size of the object. Furthermore, when three or more levels of threshold values and search ranges can be set according to the relationship between the reflectance property against the millimeter waves of the object and the size of the object, the three or more levels of threshold values and a search range corresponding to each of these threshold values may be set.

In addition, in the present embodiment a plurality of position detection results are integrated to obtain, as the size of the object to be estimated, the size of the horizontal direction based on the millimeter wave target information and the image target information, but the size of the object may be the size of the depth direction, the size of the height direction, the size in two dimension or the size in three dimension.

INDUSTRIAL APPLICABILITY

The present invention can detect an object with a high degree of accuracy in accordance with the types of the object, by setting a search area for each type of the object.

The invention claimed is:

1. An object detection apparatus, comprising:
   object position detection means for detecting positions of objects;
   object type estimating means for estimating types of the objects; and
   object estimating means for integrating a plurality of detection results for positions within a search area obtained by the object position detection means and thereby estimating sizes of the objects, wherein
   the search area is variably set based on the types of the objects estimated by the object type estimating means.

2. The object detection apparatus according to claim 1, wherein
   the object position detection means detects the positions of the objects by using a plurality of position detection criteria,
   the object type estimating means estimates the types of the objects based on the position detection criteria, according to which the object position detection means has been able to detect the positions of the objects, and
   the search area is set based on the position detection criteria, according to which the positions of the objects have been detected.

3. The object detection apparatus according to claim 2, wherein
   the object position detection means is a radar sensor that receives reflected waves of scanning electromagnetic waves from the objects to detect the positions of the objects and an image sensor that analyzes captured images to detect the positions of the objects,
   the object estimating means integrates a detection result for a position within the search area obtained by the radar sensor, with a detection result for a position within the search area obtained by the image sensor,
   the radar sensor detects the positions of the objects by using the plurality of position detection criteria,
   the positions of the objects are positions of the objects in the horizontal direction, and
   the search area is set based on the positions of the objects detected by the radar sensor and based on the position detection criteria, according to which the radar sensor has been able to detect the objects.

4. The object detection apparatus according to claim 3, wherein
   the position detection criteria used by the radar sensor are represented as threshold values of reception intensity obtained when receiving the reflected waves of the scanning electromagnetic waves from the objects, and
   the search area is set larger when the objects are detected with a threshold value of large reception intensity than when the objects are detected with a threshold value of small reception intensity.

5. An object detection method, comprising:
   detecting positions of objects;
   estimating types of the objects;
   integrating a plurality of detection results for positions detected within a search area and thereby estimating sizes of the objects; and
   setting the search area variably based on the estimated types of the objects.

6. The object detection method according to claim 5, wherein
   the detection of the positions of objects is performed by using a plurality of position detection criteria,
   the estimation of the types of objects is performed based on the position detection criteria, according to which the positions of the objects are detected, and
   the search area is set based on the position detection criteria, according to which the positions of the objects are detected.

7. The object detection method according to claim 6 wherein the detection of positions of objects is performed by a radar sensor that receives reflected waves of scanning electromagnetic waves from the objects to detect the positions of the objects and an image sensor that analyzes captured images to detect the positions of the objects, the estimation of sizes of objects is performed by integrating a detection result for a position within the search area obtained by the radar sensor, with a detection result for a position within the search area obtained by the image sensor, the radar sensor detects the positions of the objects by using the plurality of position detection criteria, the positions of the objects are positions of the objects in the horizontal direction, and the search area is set based on the positions of the objects detected by the radar sensor and based on the position detection criteria, according to which the radar sensor has been able to detect the objects.

8. The object detection method according to claim 7, wherein the position detection criteria used by the radar sensor are represented as threshold values of reception intensity obtained when receiving the reflected waves of the scanning electromagnetic waves from the objects, and the search area is set larger when the objects are detected with a threshold value of large reception intensity than when the objects are detected with a threshold value of small reception intensity.

* * * * *